Dec. 25, 1945.   J. W. WHITE   2,391,664
MANUALLY-OPERABLE AUXILIARY MECHANISM FOR AIR-BRAKE SYSTEMS
Filed Feb. 3, 1945
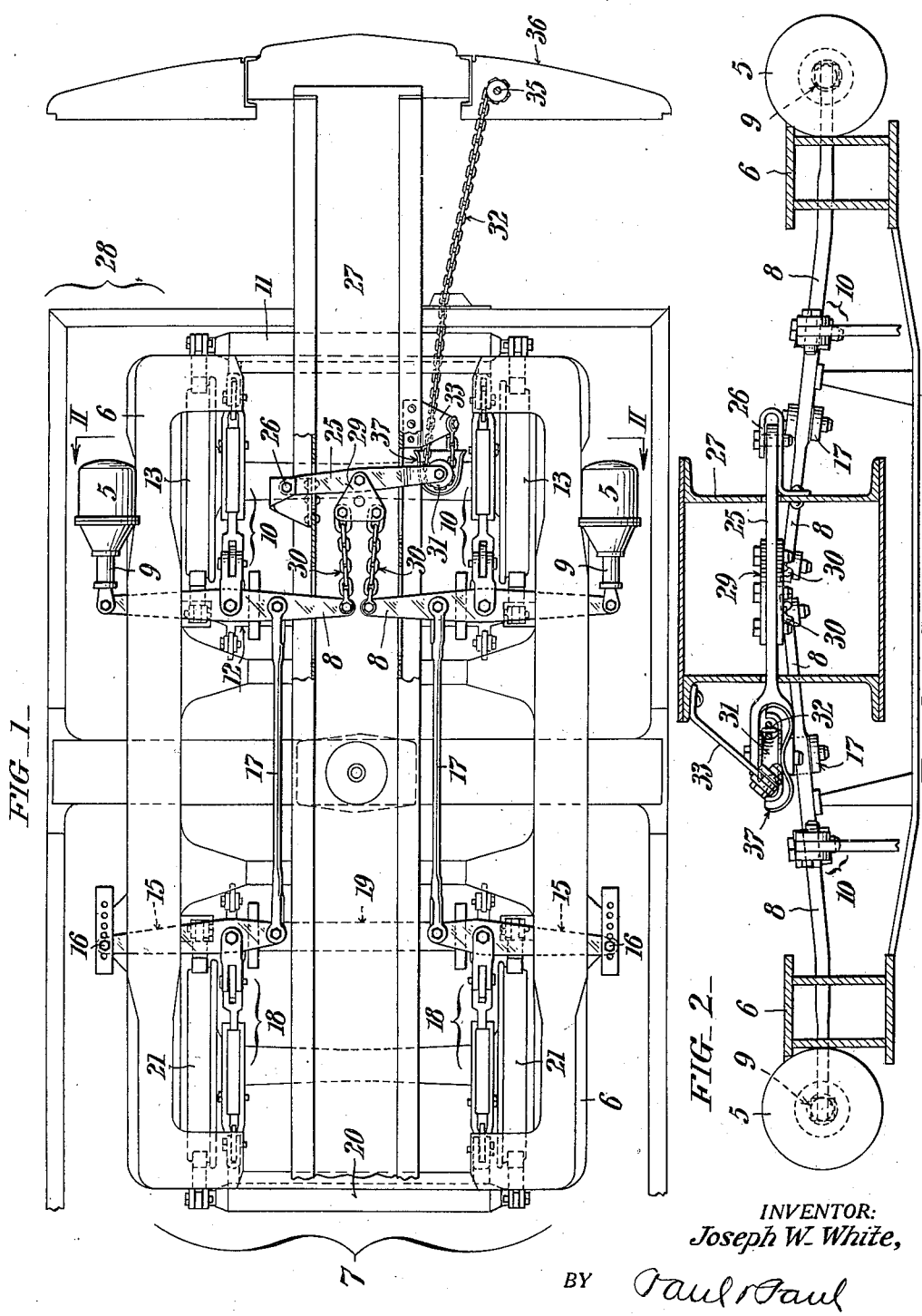
INVENTOR:
Joseph W. White,
BY Paul & Paul
ATTORNEYS.

Patented Dec. 25, 1945

2,391,664

UNITED STATES PATENT OFFICE 2,391,664

MANUALLY OPERABLE AUXILIARY MECHANISM FOR AIR-BRAKE SYSTEMS

Joseph W. White, St. Davids, Pa., assignor to The Pennsylvania Railroad Company, Philadelphia, Pa., a corporation of Pennsylvania Application February 3, 1945, Serial No. 575,975

6 Claims. (Cl. 188—107)

This invention relates to manually-operable auxiliary mechanism useful in connection with air-brake systems of railway cars and other vehicles.

My invention has for its chief object the provision of an auxiliary means of the kind referred to which is simple in construction; which can be readily incorporated in existent standardized air-brake systems without incurring any changes either in their construction or interfering with their normal mode of operation; and which moreover can be relied upon to efficiently operate such systems in the event of failure of the air supply with assurance of uniform distribution of the braking force.

Other objects and attendant advantages will appear from the following detailed description of the attached drawing, wherein Fig. 1 is a fragmentary view showing, in top plan, a portion of the underframing and running gear of a railway car and the manually-operable auxiliary mechanism of my invention; and Fig. 2 is a detail cross section taken as indicated by the angled arrows II—II in Fig. 1 and drawn to a larger scale.

The air-brake rigging herein illustrated for convenience of exemplifying my invention is generally of a well known existent commercial type in that it includes a pair of air cylinders 5 which are fixedly secured to the opposite sides of the frame 6 of the car truck designated 7. The transversely arranged live cylinder levers 8 of the rigging are pivoted at their outer ends to the piston rods 9 respectively of said cylinders, and through suitable intermediate connections 10 impart the required movements to the brake beams 11 and 12 for the forward pair of truck wheels 13. The dead cylinder levers 15 of the brake rigging are likewise transversely arranged and are adjustably pivoted at their outer ends, to the truck frames 6 at 16, said levers being motivated, through links 17, from the live cylinder levers 8 and transmit motion, through connections 18 (similar to the connections 10), to the brake beams 19 and 20 for the inner pair of truck wheels 21.

The manually-operable auxiliary mechanism with which the present invention is more particularly concerned comprises a transversely-disposed arm 25 which is fulcrumed at 26 to a bracket at one side of the center sill 27 of the car frame 28, and to which is pivoted at an intermediate point, one corner of a triangular swivel or wrist member 29. As shown, the other two corners of this wrist member 29 are directly connected, through flexible elements in the form of chains 30, to the contiguous inner ends of the live cylinder levers 8 of the air-brake rigging in such a way that the hand brake pull is equally transmitted to the cylinder levers. Trained about a sheave 31 at the swinging end of the arm 25 is another flexible element likewise in the form of a chain 32 whereof one end is connected to an anchorage 33 at the side of the center sill 27 of the car frame 28 opposite to that occupied by the bracket 26, and whereof the other end is secured to a take up means herein depicted as having the form of an upright hand wheel winding stem 35 which is suitably journaled in the end sill 36 of the said car frame. The guard shown at 37 serves to prevent the chain 32 from falling away from the sheave 31 on the arm 25.

Having thus described my invention, I claim:

1. In a railway car brake system air cylinders for the brakes of the truck wheels at opposite sides of the car and a pair of horizontally-disposed transversely-extending cylinder levers respectively connected at their outer ends to the piston rods of the cylinders; auxiliary mechanism for actuating the brakes including a horizontally-disposed arm fulcrumed on the frame of the car; equalizing connecting means interposed between the inner ends of the cylinder levers and the arm, and manually-operable means for moving said arm.

2. In a brake system having brakes for a plural wheel truck of a railway car, air cylinders at opposite sides of the car and pairs of horizontally-arranged transversely - extending inter - connected live and dead cylinder levers cooperated with the respective wheel brakes; auxiliary mechanism for actuating the brakes including a horizontally-disposed arm fulcrumed on the frame of the car; equalizing connecting means interposed directly between the live cylinder levers and said arm, and manually-operable means for moving said arm.

3. In a railway car braking system having air cylinders for the brakes of truck wheels at opposite sides of the car and horizontally-disposed transversely-arranged cylinder levers respectively connected at their outer ends to the piston rods of the cylinders; auxiliary mechanism for actuating the brakes including a transversely-arranged horizontally-disposed arm fulcrumed at one end on the frame of the car; equalizing connecting means interposed between the inner ends of the cylinder levers and said arm at an intermediate point, a manually-operable take-up means, and a flexible connector extending between the outer end of said arm and said take-up means.

4. In a railway car braking system having air cylinders for the brakes of truck wheels at opposite sides of the car and transversely-arranged horizontally-disposed cylinder levers respectively connected at their outer ends to the piston rods of the cylinders; auxiliary mechanism for actuating the brakes including a transversely-arranged horizontally-disposed arm fulcrumed at one end on the frame of the car, a swivel member pivoted to the arm at an intermediate point; flexible connectors extending between the inner ends of the cylinder levers and spaced points on the swivel member, a sheave at the outer end of the aforesaid arm, and a flexible element passing about said sheave, said element being connected at one end to a fixed anchorage on the car frame and at the other end to a winding shaft journaled in said frame.

5. In a railway car braking system having air cylinders for the brakes of truck wheels at opposite sides of the car, and transversely arranged horizontally-disposed cylinder levers respectively connected at their outer ends to the piston rods of the cylinders; auxiliary mechanism for actuating the brakes including a transversely-arranged horizontally-disposed arm fulcrumed at one end on the frame of the car; equalizing connecting means interposed between the inner ends of the cylinder levers at an intermediate point of said arm, a manually-operable winding shaft journaled in said frame, and a flexible connector extending between the outer end of said arm and said winding shaft.

6. In a railway car braking system having air cylinders for the brakes of truck wheels at opposite sides of the car, and transversely-arranged horizontally-disposed cylinder levers respectively connected at their outer ends to the piston rods of the cylinders; auxiliary mechanism for actuating the brakes including a transversely-arranged horizontally-disposed arm fulcrumed at one end on the frame of the car; a swivel member pivoted at an intermediate point on the arm, flexible connectors extending between the inner ends of the cylinder levers and spaced points on the swivel member, a sheave at the outer end of the aforesaid arm, a manually-operable take-up means, and a flexible connector extending between the swinging end of said arm and said take-up means.

JOSEPH W. WHITE.